US012786877B2

(12) United States Patent
He

(10) Patent No.: US 12,786,877 B2
(45) Date of Patent: Nov. 3, 2026

(54) METHOD FOR DETERMINING ENERGY-SAVING SIGNAL MONITORING OCCASION, TERMINAL DEVICE AND CHIP

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 328 days.

(21) Appl. No.: 18/407,123

(22) Filed: Jan. 8, 2024

(65) Prior Publication Data

US 2024/0147371 A1 May 2, 2024

Related U.S. Application Data

(63) Continuation of application No. PCT/CN2021/114693, filed on Aug. 26, 2021.

(51) Int. Cl.

*H04W 52/02* (2009.01)
*H04W 68/00* (2009.01)
*H04W 72/232* (2023.01)

(52) U.S. Cl.

CPC ..... *H04W 52/0235* (2013.01); *H04W 68/005* (2013.01); *H04W 72/232* (2023.01)

(58) Field of Classification Search

CPC ........... H04W 52/0235; H04W 68/005; H04W 72/232

See application file for complete search history.

(56) References Cited

U.S. PATENT DOCUMENTS

2022/0124625 A1* 4/2022 Fu ........................ H04W 68/005
2022/0272636 A1* 8/2022 Li .......................... H04W 52/02
2023/0388927 A1* 11/2023 Yang ...................... H04W 68/02
2023/0397109 A1* 12/2023 Wang ................ H04W 52/0235

(Continued)

FOREIGN PATENT DOCUMENTS

CN 110971373 A 4/2020
CN 111194072 A 5/2020
CN 111194084 A 5/2020

(Continued)

OTHER PUBLICATIONS

Supplementary European Search Report in the European application No. 25201054.1, mailed on Oct. 16, 2025.

(Continued)

*Primary Examiner* — Derrick V Rose
(74) *Attorney, Agent, or Firm* — Ladas & Parry LLP

(57) ABSTRACT

A method and apparatus for determining an energy-saving signal monitoring occasion, and a terminal device are provided. The method includes: the terminal device determines a target paging unit, the target paging unit being a paging occasion (PO) or a paging frame (PF) corresponding to the terminal device; the terminal device determines a monitoring occasion of a first energy-saving signal on the basis of the target paging unit, the first energy-saving signal being an energy-saving signal associated with the target paging unit or an energy-saving signal associated with a target paging unit group, and the target paging unit belonging to the target paging unit group.

20 Claims, 6 Drawing Sheets

(56) References Cited

U.S. PATENT DOCUMENTS

2024/0089921 A1 3/2024 Ma et al.

FOREIGN PATENT DOCUMENTS

CN 111294897 A 6/2020
CN 113163476 A 7/2021

OTHER PUBLICATIONS

CATT: "System overhead analysis of PEI and TRS/CSI-RS for IDLE mode UE", 3GPP Draft; R1-2100396, 3rd Generation Partnership Project (3GPP), Mobilecompetence Centre ; 650, Route Des Lucioles ; F-06921 Sophia-Antipolis Cedex; France vol. RAN WG1, no. e-Meeting; 2021012520210205, Jan. 19, 2021 (Jan. 19, 2021), XP051970999, the whole document, 4 pages.
OPPO: "Potential paging enhancements", Partnership Project (3GPP), Mobilecompetence Centre ; 650, Route Des Lucioles; F-06921 Sophia-Antipolis Cedex; France 3GPP Draft; R1-2100168, 3rd Generation vol. RAN WG1, No. e-Meeting; 2021012520210205, Jan. 18, 2021 (Jan. 18, 2021), XP051970286, the whole document, 4 pages.
Supplementary European Search Report in the European application No. 21954539.9, mailed on Jun. 19, 2024, 9 pages.
OPPO, "Further discussion on Paging enhancements for power saving", 3GPP TSG RAN WG1 #105-e R1-2104787, May 27, 2021 (May 27, 2021), entire document. 6 pages.
International Search Report in the international application No. PCT/CN2021/114693, mailed on Mar. 28, 2022. 5 pages with English translation.
Written Opinion of the International Search Authority in the international application No. PCT/CN2021/114693, mailed on Mar. 28, 2022. 6 pages with English translation.
"3rd Generation Partnership Project; Technical Specification Group Radio Access Network; NR; User Equipment (UE) procedures in Idle mode and RRC Inactive state (Release 16)", 3GPP TS 38.304 V16.0.0 (Mar. 2020), section 7.1. 36 pages.
"3rd Generation Partnership Project; Technical Specification Group Radio Access Network; NR; Physical layer procedures for control (Release 16)", 3GPP TS 38.213 V16.2.0 (Jun. 2020), section 10.3. 176 pages.
"3rd Generation Partnership Project; Technical Specification Group Radio Access Network; NR; Radio Resource Control (RRC) protocol specification (Release 16)", 3GPP TS 38.331 V16.3.1 (Jan. 2021), pp. 420-422, 929 pages.
"3rd Generation Partnership Project; Technical Specification Group Radio Access Network; NR; Radio Resource Control (RRC) protocol specification (Release 16)", 3GPP TS 38.331 V16.1.0 (Jul. 2020), pp. 421. 902 pages.

* cited by examiner

METHOD FOR DETERMINING ENERGY-SAVING SIGNAL MONITORING OCCASION, TERMINAL DEVICE AND CHIP

CROSS-REFERENCE TO RELATED APPLICATIONS

This application is a continuation of International Patent Application No. PCT/CN2021/114693 filed on Aug. 26, 2021, disclosure of which is hereby incorporated by reference in its entirety.

BACKGROUND

In a paging mechanism, a concept of energy-saving signal is introduced to optimize energy-saving of a terminal device. The energy-saving signal is located before a Paging Occasion (PO), and is configured to indicate whether the terminal device monitors a paging Physical Downlink Control Channel (PDCCH) on the PO.

However, in terms of a monitoring occasion of the energy-saving signal, a terminal device is unable to receive the energy-saving signal effectively due to the face that relevant solutions of specifying how to determine the monitoring occasion of the energy-saving signal are absent at present.

SUMMARY

Embodiments of the disclosure provide a method for determining a monitoring occasion of an energy-saving signal, terminal device and a chip.

A method for determining a monitoring occasion of an energy-saving signal provided in an embodiment of the disclosure includes the following operations. A terminal device determines a target paging unit which is a PO or Paging Frame (PF) corresponding to the terminal device. The terminal device determines a monitoring occasion of a first energy-saving signal based on the target paging unit, here, the first energy-saving signal is an energy-saving signal associated with the target paging unit or an energy-saving signal associated with a target paging unit group, and the target paging unit belongs to the target paging unit group.

A terminal device provided in an embodiment of the disclosure includes a processor and a memory. The memory is configured to store a computer program. The processor is configured to call and run the computer program stored in the memory, to: determine a target paging unit which is a PO or PF corresponding to the terminal device; and determine a monitoring occasion of a first energy-saving signal based on the target paging unit, wherein the first energy-saving signal is an energy-saving signal associated with the target paging unit or an energy-saving signal associated with a target paging unit group, and the target paging unit belongs to the target paging unit group.

A chip provided in an embodiment of the disclosure is configured to implement a method for determining a monitoring occasion of an energy-saving signal, the method including: determining, by a terminal device, a target paging unit which is a PO or Paging Frame PF corresponding to the terminal device; and determining, by the terminal device, a monitoring occasion of a first energy-saving signal based on the target paging unit, wherein the first energy-saving signal is an energy-saving signal associated with the target paging unit or an energy-saving signal associated with a target paging unit group, and the target paging unit belongs to the target paging unit group.

BRIEF DESCRIPTION OF THE DRAWINGS

The drawings described here are intended to provide a further understanding of the disclosure and constitute a part of the disclosure. Exemplary embodiments of the disclosure and descriptions thereof are intended to explain the disclosure and do not constitute an improper limitation to the disclosure. In the drawings.

DETAILED DESCRIPTION

The technical solutions in the embodiments of the disclosure will be described below with reference to the drawings in the embodiments of the disclosure. It is apparent that the described embodiments are part of the embodiments of the disclosure, rather than all of the embodiments. Based on the embodiments in the disclosure, all other embodiments obtained by those of ordinary skill in the art without paying any creative work fall within the scope of protection of the disclosure.

Figure 1:
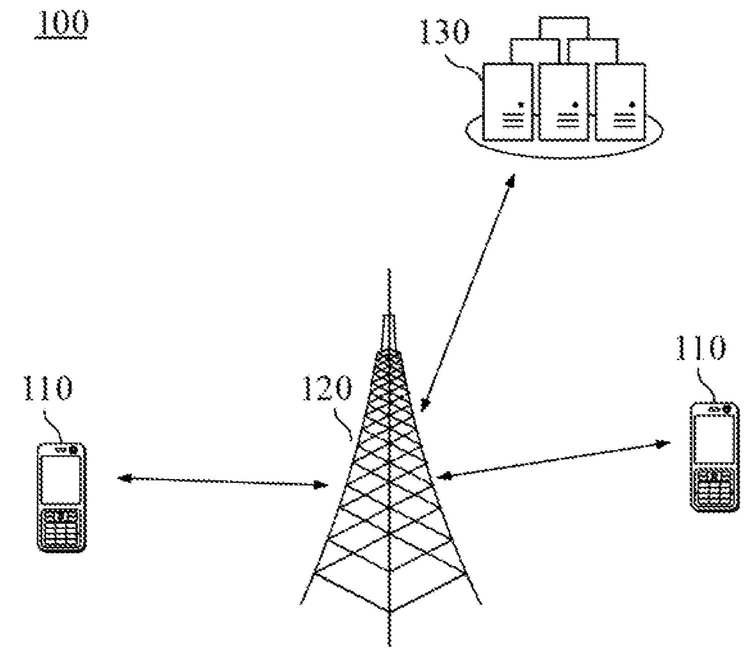
FIG. 1 is a schematic diagram of an application scenario according to an embodiment of the disclosure.

FIG. 1 is a schematic diagram of an application scenario according to an embodiment of the disclosure.

As shown in FIG. 1, a communication system 100 may include a terminal device 110 and a network device 120. The network device 120 may communicate with the terminal device 110 through an air interface. Multi-service transmission is supported between the terminal device 110 and the network device 120.

It should be understood that the embodiments of the disclosure is only exemplified by the communication system 100, however, the embodiments of the disclosure are not limited thereto. That is, the technical solutions of the embodiments of the disclosure may be applied to various communication systems, such as a Long Term Evolution (LTE) system, LTE Time Division Duplex (TDD), a Universal Mobile Telecommunication System (UMTS), an Internet of Things (IoT) system, a Narrow Band Internet of Things (NB-IoT) system, an enhanced Machine-Type Communications (eMTC) system, a 5th generation (5G) communication system (also referred to as a New Radio (NR) communication system), or a future communication system, etc.

In the communication system 100 shown in FIG. 1, the network device 120 may be an access network device communicated with the terminal device 110. The access network device may provide communication coverage for a specific geographical area and may communicate with the terminal device 110 (e.g., a User Equipment (UE)) within the coverage area.

The network device 120 may be an Evolutional Node B (eNB or eNodeB) in a LTE system, or a Next Generation Radio Access Network (NG RAN) device, or a next generation Node B (gNB) in an NR system, or a wireless controller in a Cloud Radio Access Network (CRAN). Or, the network device 120 may be a relay station, an access point (AP), a vehicle-mounted device, a wearable device, a hub, a switch, a bridge, a router, or a network device in a future evolutional Public Land Mobile Network (PLMN), etc.

The terminal device 110 may be any terminal device, it includes but is not limited to terminal devices connected to the network device 120 or other terminal devices with wires or wirelessly.

For example, the terminal device 110 may refer to an access terminal, a UE, a user unit, a user station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, an IoT device, a satellite hand-held terminal, a Wireless Local Loop (WLL) station, or a Personal Digital Assistant (PDA), a hand-held device with wireless communication functions, a computing device, or other processing devices connected to a wireless modem, a vehicle-mounted device, a wearable device, a terminal device in a 5G network, or a terminal device in a future evolutional network, etc.

The terminal device 110 may be used for Device to Device (D2D) communication.

The wireless communication system 100 may further include a core network device 130 communicated with a base station. The core network device 130 may be a 5G Core (5GC) device, such as an Access and Mobility Management Function (AMF), an Authentication Server Function (AUSF), a User Plane Function (UPF), a Session Management Function (SMF). Optionally, the core network device 130 may also be an Evolved Packet Core (EPC) device of a LTE network, such as a Session Management Function+ Core Packet Gateway (SMF+PGW-C) device. It should be understood that SMF+PGW-C may simultaneously implement functions which may be implemented by SMF and PGW-C. In a network evolution process, the above core network device may also be called by other names, or new network entities may be formed by dividing functions of the core network, which are not limited in the embodiments of the disclosure.

Various function units in the communication system 100 may also establish connections there-between through a next generation network (NG) interface, to implement communication.

For example, the terminal device establishes an air interface connection with the access network device through an NR interface, to transmit user plane data and control plane signaling; the terminal device may establish a control plane signaling connection with the AMF through an NG interface 1 (referred to as N1 for abbreviation); the access network device, such as a next generation wireless access base station (gNB), may establish a user plane data connection with the UPF through an NG interface 3 (referred to as N3 for abbreviation); the access network device may establish a control plane signaling connection with the AMF through an NG interface 2 (referred to as N2 for abbreviation); the UPF may establish a control plane signaling connection with the SMF through an NG interface 4 (referred to as N4 for abbreviation); the UPF may exchange the user plane data with a data network through an NG interface 6 (referred to as N6 for abbreviation); the AMF may establish a control plane signaling connection with the SMF through an NG interface 11 (referred to as N11 for abbreviation); the SMF may establish a control plane signaling connection with a Packet Control Function (PCF) through an NG interface 7 (referred to as N7 for abbreviation).

FIG. 1 exemplarily shows a base station, a core network device and two terminal devices. Optionally, the wireless communication system 100 may include multiple base station devices, and other numbers of terminal devices may be included in coverage of each base station, which are not limited in the embodiments of the disclosure.

It should be noted that FIG. 1 only exemplifies a system to which the disclosure is applicable by way of examples. Of course, the methods shown in the embodiments of the disclosure may also be applied to other systems. Furthermore, terms "system" and "network" are often used interchangeably here. A term "and/or" here is only an association relationship describing associated objects, and indicates that there may be three relationships. For example, A and/or B may indicate three situations, that is, A exists alone, A and B exist simultaneously, and B exists alone. Furthermore, a character "/" here usually indicates that anterior and posterior associated objects are in a "or" relationship. It should also be understood that "indication" mentioned in the embodiments of the disclosure may be a direct indication, or may be an indirect indication, or may mean that there is an association relationship. For example, A indicates B, which may mean that A directly indicates B, for example, B may be obtained through A; or, may mean that A indirectly indicates B, for example, A indicates C, and B may be obtained through C; or, may mean that there is an association relationship between A and B. It should also be understood that "correspond" mentioned in the embodiments of the disclosure may mean that there are direct correspondences or indirect correspondences between two objects; or, may mean that there is an association relationship between two objects; or, may be relationships such as indicate and indicated, configure and configured, etc. It should also be understood that "predefined" or "predefined rule" mentioned in the embodiments of the disclosure may be implemented by pre-saving corresponding codes, tables or other modes available to indicate relevant information in devices (for example, including terminal devices and network devices), specific implementations thereof are not limited in the disclosure. For example, "predefined" may refer to what defined in a protocol. It should also be understood that in the embodiments of the disclosure, the "protocol" may refer to a standard protocol in the communication field, and for example, may include a LTE protocol, an NR protocol, and relevant protocols applied to a future communication system, which are not limited in the disclosure.

In order to facilitate understanding the technical solutions of the embodiments of the disclosure, relevant technologies of the embodiments of the disclosure are described below. The following relevant technologies used as optional solutions may be arbitrarily combined with the technical solutions of the embodiments of the disclosure, all of which fall within the scope of protection of the embodiments of the disclosure.

Discontinuous Reception (DRX)

In order to reduce power consumption of a terminal device, a DRX mechanism is introduced, so that the terminal device may not need to turn on a receiver all the way when the terminal device does not receive data, instead, the terminal device enters a DRX state to achieve a power-saving purpose. In the DRX mechanism, a terminal device in a Radio Resource Control (RRC) connection state is configured with a DRX cycle which consists of "On Duration (corresponding to DRX active time)" and "Opportunity for DRX (corresponding to DRX inactive time)". In the "On Duration" time, the terminal device monitors and receives downlink channels and signals including a Physical Downlink Control Channel (PDCCH); in the "Opportunity for DRX" time, the terminal device does not receive downlink channels and signals such as PDCCH or the like, to reduce power consumption. A terminal device in a RRC idle state needs to receive a paging message in a manner similar to the DRX mechanism; there is a Paging Occasion (PO) in a DRX cycle, and the terminal device only monitors a paging PDCCH and paging message in the PO, and does not monitor the paging PDCCH or receive the paging message at a time other than the PO, to achieve the power-saving purpose. During the PO, the terminal device determines whether there is a paging message by detecting the paging PDCCH scrambled by a Paging-Radio Network Temporary Identity (P-RNTI).

In the evolution of 5G, higher requirements are put forward for energy-saving of the terminal device. For example, in an existing DRX mechanism, during each On Duration, the terminal device needs to continuously detect the PDCCH to determine whether the base station schedules data transmission to be sent to the terminal device itself. However, most of terminal devices may not need to receive data transmission for a long period of time, but still need to maintain a regular wake-up mechanism to monitor possible downlink transmissions. There is space for further optimization of energy-saving of such terminal devices. Similar descriptions are also applicable to a situation where the terminal device in the RRC idle state receives the paging message.

Figure 2:
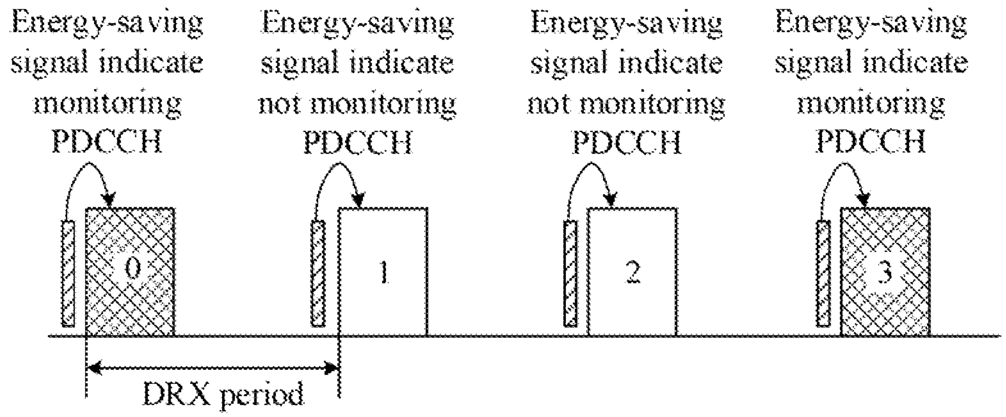
FIG. 2 is a schematic diagram of an energy-saving signal indicating whether a PDCCH is monitored, provided in an embodiment of the disclosure.

In order to optimize energy-saving of the terminal device, an energy-saving signal is introduced. The energy-saving signal is used in combination with the DRX mechanism, and the terminal device receives the energy-saving signal before the On Duration. When there is data transmission for the terminal device in a DRX cycle, the energy-saving signal "wakes up" the terminal device to monitor the PDCCH during the On Duration; otherwise, when there is no data transmission for the terminal device in a DRX cycle, the energy-saving signal does not "wake up" the terminal device, the terminal device does not need to monitor the PDCCH during the On Duration. Compared to the existing DRX mechanism, when there is no data transmission for the terminal device, the terminal device may omit monitoring the PDCCH during the On Duration, thereby achieving energy-saving. A time when the terminal device is outside the On Duration is referred to as DRX inactive time, and a time in the On Duration is referred to as DRX active time. In an example, a process of indicating, through the energy-saving signal, whether the terminal device monitors the PDCCH during the On Duration is as shown in FIG. 2.

Figure 3:
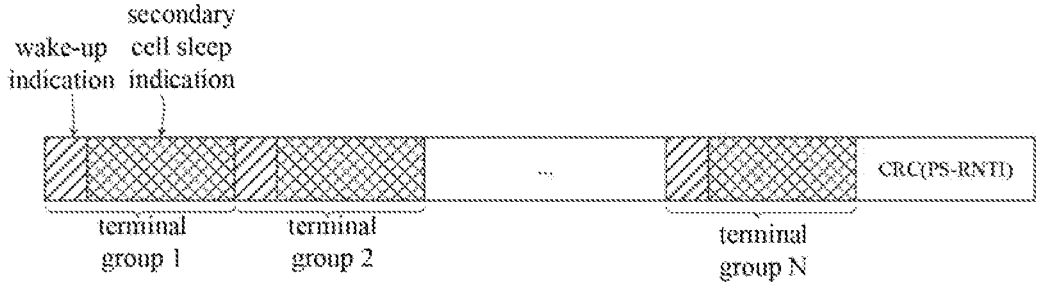
FIG. 3 is a schematic diagram of an energy-saving wake-up signal carrying energy-saving indication information of multiple users, provided in an embodiment of the disclosure.

The energy-saving signal may be carried by a newly defined Downlink Control Information (DCI) format 2_6. The network configures a search space set for the terminal device to detect a PDCCH carrying the DCI format 2_6. In the energy-saving signal, a number of bits required by a single user is at most 6, including 1 wake-up indication bit and at most 5 secondary cell sleep indication bits. The energy-saving signal carries indication bits of multiple users to improve resource usage efficiency. As shown in FIG. 3, the network notifies a starting position of an energy-saving indication bit of each user in DCI, and a number of bits for a single user may be obtained implicitly by a configured number of secondary cell (carrier) groups (the wake-up indication bit appears certainly, and a number of secondary cell (carrier) sleep indication bits may be 0). Furthermore, the network may also notify the terminal device of a total number of bits of the DCI and Power Saving-Radio Network Temporary Identity (PS-RNTI) of the scrambled PDCCH.

Paging

In the NR system, the network may send paging to terminal devices in RRC idle state and RRC inactive state. The paging process may be triggered by the core network or the base station, to send a paging request to the terminal devices in the RRC idle state and the RRC inactive state, or to notify update of system information, and to notify the terminal device to receive information such as Earthquake and Tsunami Warning System (ETWS), Commercial Mobile Alert Service (CMAS), etc. After receiving the paging message from the core network, the base station interprets contents therein, obtains a Tracking Area Identity (TAI) list (i.e., TA list) of the terminal device, and performs air interface paging in a cell belonging to a tracking area in the list. A core domain of the paging message is not decoded at the base station, instead, transparently transmitted to the terminal device. After receiving the paging message from the core network, the base station gathers paging messages of terminal devices with the same PO into one paging message, and transmits the paging message to relevant terminal devices through a paging channel. The terminal device receives paging parameters through the system information, calculates PO in combination with its own UE_ID, and receives the paging message on a corresponding PO. The paging message is carried by a Physical Downlink Shared Channel (PDSCH), and the terminal device obtains paging indication information by detecting the PDCCH scrambled by the P-RNTI, thereby receiving the paging message. The terminal device in the RRC idle state may save power by way of DRX, monitors the PDCCH scrambled by the P-RNTI in PO on PF in a DRX cycle, and then receives the paging message. The terminal device obtains DRX-related configuration information from SIB2.

The PF indicates which System Frame Number (SFN) the paging message should appear on, and the PO indicates a possible appearance moment. A PF may include one or more POs, and in each DRX cycle or paging cycle, the terminal device only needs to monitor a PO which belongs to the terminal device itself.

SFN meeting the following formula may be used as a PF frame:

$$(SFN+PF\_offset) \bmod T=(T \text{ div } N)*(UE\_ID \bmod N).$$

In the PF, an index of the PO corresponding to the terminal device, i.e., i_s, may be calculated according to the following formula:

$$i\_s=\text{floor}(UE\_ID/N) \bmod Ns.$$

Figure 4:
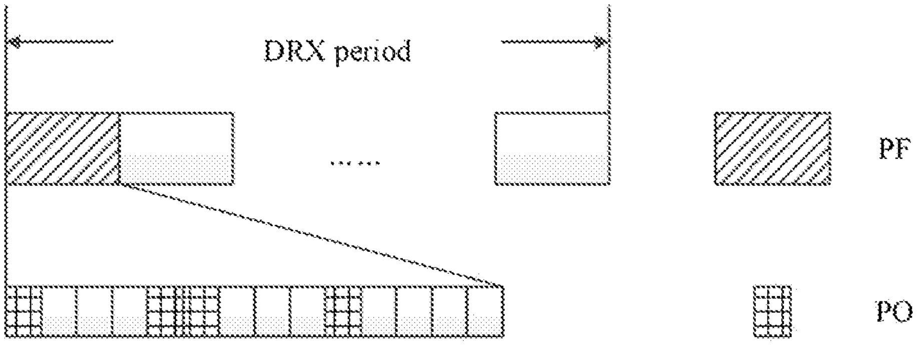
FIG. 4 is a schematic diagram of PF and PO provided in an embodiment of the disclosure.

T represents the DRX cycle of the terminal device. In a case that a default DRX cycle indicated in a system message is recorded as T_sib, then when a DRX value T_ue of the terminal device is configured, T=min(T_ue, T_sib); when T_ue is not configured, a default value indicated in the system message is used, T=T_sib. UE_ID=(5G-S-TMSI mod 1024), 5G-S-TMSI is identifier (ID) information of the terminal device. N is a number of PFs in T. Ns is a number of POs in a PF. PF_offset is a frame offset for determining the PF. As an example, in a DRX cycle, position of PF and position of PO in the PF are shown in FIG. 4.

In NR technologies, in case of UE in the idle state, the base station does not know what beam is used to send paging to the UE, thus the base station uses a beam scanning manner to send paging. In order to support multi-beam transmission of paging, a PO is defined as a group of PDCCH monitoring occasions, and a PF may include one or more POs or start time points of the POs. In a case of SearchSpaceId of a paging search space=0, since each Synchronization Signal Block (SSB) index corresponds to a PDCCH monitoring occasion, and different SSB indexes correspond to different beams, multi-beam transmission of paging may be supported through multiple PDCCH monitoring occasions of a PO corresponding to different SSB indexes.

Energy-Saving of Terminal Device in RRC Idle State

The terminal device in the RRC idle state monitors the paging PDCCH periodically on a PO corresponding to itself. However, in an actual situation, a probability for the terminal device to be paged may not be high. The terminal device monitors the paging PDCCH on the corresponding PO periodically, but fails to monitor the paging PDCCH sent to itself, which may cause waste of power. Similar to energy-saving of a terminal device in a RRC connection state, energy-saving of the terminal device in the RRC idle state receiving the paging message is optimized, and a similar energy-saving signal is introduced. A type of energy-saving signal is referred to as Paging Early Indication (PEI) which is configured to indicate whether the terminal device should monitor the paging PDCCH on a target PO before arrival of this PO. The energy-saving signal may be a sequence-based signal or a PDCCH channel-based signal. Using the PDCCH channel to carry the energy-saving signal may continue to use an existing PDCCH design, thus it is easy to be compatible and multiplexed with existing systems and other channels. The energy-saving signal based on the PDCCH channel may also carry more energy-saving information, for example, may carry sub-grouping information which is configured to indicate sub-grouping corresponding to the energy-saving information. Here, the sub-grouping is directed to further grouping of multiple terminal devices corresponding to a PO through UE_ID calculation, and the sub-grouping information may indicate whether paging terminal devices need to be received on the target PO more finely in combination with the energy-saving information.

Figure 5:
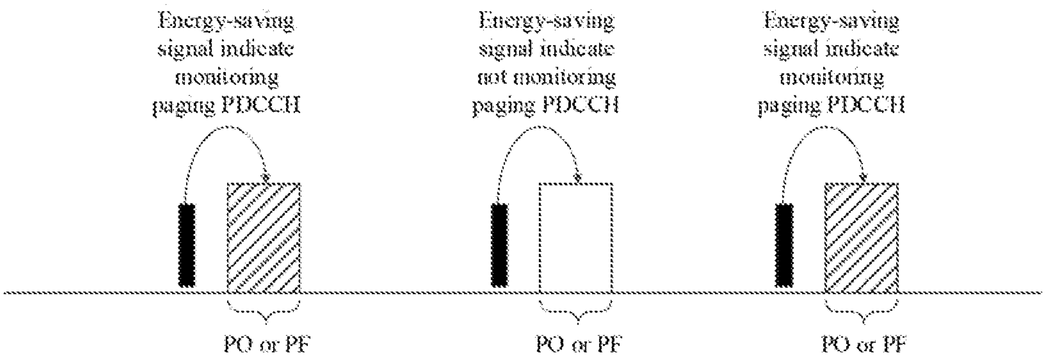
FIG. 5 is a schematic diagram of an energy-saving signal indicating whether a paging PDCCH is monitored, provided in an embodiment of the disclosure.

As shown in FIG. 5, an energy-saving signal indicates whether one or more subgroups of terminal devices monitor the paging PDCCH on a corresponding PF or PO.

In case of terminal devices in the RRC idle state and the RRC inactive state, a PO where the paging PDCCH needs to be monitored may be determined according to the foregoing relevant solutions. However, in case of a monitoring occasion of the energy-saving signal, how to determine the monitoring occasion of the energy-saving signal is not specified in the related art. To this end, the following technical solutions of the embodiments of the disclosure are proposed.

In order to facilitate understanding the technical solutions of the embodiments of the disclosure, the technical solutions of the disclosure are described in detail below through specific embodiments. The above relevant technologies used as optional solutions may be arbitrarily combined with the technical solutions of the embodiments of the disclosure, all of which fall within the scope of protection of the embodiments of the disclosure. The embodiments of the disclosure include at least a part of the following contents.

Figure 6:
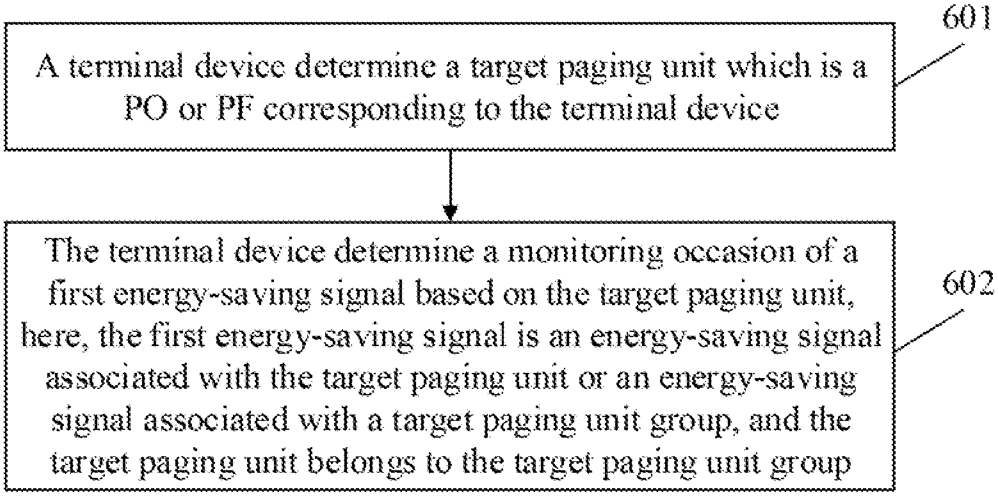
FIG. 6 is a schematic flowchart of a method for determining a monitoring occasion of an energy-saving signal, provided in an embodiment of the disclosure.

FIG. 6 is a schematic flowchart of a method for determining a monitoring occasion of an energy-saving signal, provided in an embodiment of the disclosure. As shown in FIG. 6, the method for determining a monitoring occasion of an energy-saving signal includes the following operations 601 and 602.

At 601, a terminal device determines a target paging unit which is a PO or PF corresponding to the terminal device.

In the embodiment of the disclosure, the target paging unit is the PO or PF corresponding to the terminal device.

In some optional implementations, the terminal device may determine SFN of the PF corresponding to the terminal device through the following formula: (SFN+PF_offset) mod T=(T div N)*(UE_ID mod N).

In some optional implementations, the terminal device may determine an index i_s of the PO corresponding to the terminal device through the following formula: i_s=floor (UE_ID/N) mod Ns.

In the above solution, T represents a DRX cycle of the terminal device. In a case that a default DRX cycle indicated in a system message is recorded as T_sib, then when a DRX value T_ue of the terminal device is configured, T=min (T_ue, T_sib); when T_ue is not configured, a default value indicated in the system message is used, T=T_sib.

In the above solution, UE_ID is UE_ID of the terminal device, optionally, UE_ID=(5G-S-TMSI mod 1024), 5G-S-TMSI is ID information of the terminal device.

In the above solution, N is a number of PFs in T. Ns is a number of POs in a PF. PF_offset is a frame offset for determining the PF.

At 602, the terminal device determines a monitoring occasion of a first energy-saving signal based on the target paging unit, here, the first energy-saving signal is an energy-saving signal associated with the target paging unit or an energy-saving signal associated with a target paging unit group, and the target paging unit belongs to the target paging unit group.

In some optional implementations, the first energy-saving signal is a PEI signal. It should be noted that name of the first energy-saving signal is not limited in the disclosure.

In the embodiment of the disclosure, the terminal device may use a monitoring occasion corresponding to the first energy-saving signal associated with the target paging unit as a monitoring occasion which needs to be monitored. Or, the terminal device may use a monitoring occasion corresponding to the first energy-saving signal associated with the target paging unit group to which the target paging unit belongs as the monitoring occasion which needs to be monitored. Descriptions thereof are made below.

First Solution

In the embodiment of the disclosure, in a case that the first energy-saving signal is the energy-saving signal associated with the target paging unit, the terminal device determines a time window where the monitoring occasion of the first energy-saving signal is located, based on a time domain position of the target paging unit, one or more monitoring occasions of the first energy-saving signal are included in the time window.

In some optional implementations, the terminal device determines the time window where the monitoring occasion of the first energy-saving signal is located, based on the time domain position of the target paging unit and a first configuration parameter.

In some optional implementations, the first configuration parameter includes at least one of:

- a first parameter, configured to indicate an offset of a start time of the time window relative to a start time or end time of the target paging unit;
- a second parameter, configured to indicate an offset of an end time of the time window relative to the start time or end time of the target paging unit; or
- a third parameter, configured to indicate a time length of the time window.

As an example, the first configuration parameter includes a first parameter and a second parameter, the first parameter is configured to indicate an offset of a start time of the time window relative to an end time of the target paging unit, and the second parameter is configured to indicate an offset of an end time of the time window relative to the end time of the target paging unit.

As an example, the first configuration parameter includes a first parameter and a third parameter, the first parameter is configured to indicate an offset of a start time of the time window relative to an end time of the target paging unit, and the third parameter is configured to indicate a time length of the time window.

As an example, the first configuration parameter includes a second parameter and a third parameter, the second parameter is configured to indicate an offset of an end time of the time window relative to the end time of the target paging unit, and the third parameter is configured to indicate a time length of the time window.

In the embodiment of the disclosure, the first energy-saving signal is configured to indicate energy-saving information corresponding to a paging unit, and the paging unit is the target paging unit. As an example, the first energy-saving signal is configured to indicate energy-saving information corresponding to a PO or PF, and the PO or PF is a PO or PF corresponding to the terminal device.

In some optional implementations, the first energy-saving signal is configured to indicate energy-saving information corresponding to a PO, and the PO corresponds to a terminal group.

First option: the first energy-saving signal includes a piece of energy-saving information, and the piece of energy-saving information is configured to indicate whether the terminal group monitors a paging PDCCH; or Second option: the first energy-saving signal includes multiple energy-saving information, and each of multiple energy-saving information is configured to indicate whether a subgroup in the terminal group monitors the paging PDCCH.

Here, it should be noted that each PO corresponds to a terminal group, and all terminal devices in the terminal group correspond to the same PO. The terminal group may be further divided into multiple subgroups in a specific manner, and optionally, division of the subgroups may be made according to UE_ID of the terminal devices.

Second Solution

In the embodiment of the disclosure, in a case that the first energy-saving signal is the energy-saving signal associated with the target paging unit group, the terminal device determines the target paging unit group to which the target paging unit belongs, based on the target paging unit, and the terminal device determines a time window where the monitoring occasion of the first energy-saving signal is located, based on a time domain position of the target paging unit group, one or more monitoring occasions of the first energy-saving signal are included in the time window.

In some optional implementations, the terminal device determines the target paging unit group to which the target paging unit belongs, based on a time domain position of the target paging unit and configuration information of a paging unit group, the configuration information of the paging unit group is configured to determine time domain positions of multiple paging units.

Here, the terminal device determines that the time domain position of the target paging unit is the same as a time domain position of a certain paging unit in the paging unit group, then the terminal device determines that the target paging unit belongs to the paging unit group, that is, determines that the paging unit group is the target paging unit group.

Furthermore, optionally, the configuration information of the paging unit group may also determine a number of multiple paging units included in the paging unit group.

In some optional implementations, the terminal device determines the time window where the monitoring occasion of the first energy-saving signal is located, based on the time domain position of the target paging unit group and a second configuration parameter.

In some optional implementations, the second configuration parameter includes at least one of:

- a fourth parameter, configured to indicate an offset of a start time of the time window relative to a start time of a first paging unit in the target paging unit group or an end time of a last paging unit in the target paging unit group;
- a fifth parameter, configured to indicate an offset of an end time of the time window relative to the start time of the first paging unit in the target paging unit group or the end time of the last paging unit in the target paging unit group; or
- a sixth parameter, configured to indicate a time length of the time window.

As an example, the first configuration parameter includes a fourth parameter and a fifth parameter, the fourth parameter is configured to indicate an offset of a start time of the time window relative to a start time of a first paging unit in the target paging unit group, and the fifth parameter is configured to indicate an offset of an end time of the time window relative to the start time of the first paging unit in the target paging unit group.

As an example, the first configuration parameter includes a fourth parameter and a sixth parameter, the fourth parameter is configured to indicate an offset of a start time of the time window relative to a start time of a first paging unit in the target paging unit group, and the sixth parameter is configured to indicate a time length of the time window.

As an example, the first configuration parameter includes a fifth parameter and a sixth parameter, the fifth parameter is configured to indicate an offset of an end time of the time window relative to the start time of the first paging unit in the target paging unit group, and the sixth parameter is configured to indicate a time length of the time window.

In the embodiment of the disclosure, the first energy-saving signal is configured to indicate energy-saving information corresponding to a paging unit group, and the paging unit group includes multiple paging units which include the target paging unit. As an example, the first energy-saving signal is configured to indicate energy-saving information corresponding to a PO group or PF group, and the PO group or PF group is a PO group or PF group corresponding to the terminal device.

In some optional implementations, the first energy-saving signal is configured to indicate energy-saving information corresponding to a PO group, each PO in the PO group corresponds to a terminal group, and the PO group corresponds to multiple terminal groups.

First option: the first energy-saving signal includes a piece of energy-saving information, and the piece of energy-saving information is configured to indicate whether multiple terminal groups monitor a paging PDCCH; or Second option: the first energy-saving signal includes multiple energy-saving information, and each of multiple energy-saving information is configured to indicate whether one of multiple terminal groups monitors the paging PDCCH; or Third option: the first energy-saving signal includes multiple energy-saving information, and each of multiple energy-saving information is configured to indicate whether a subgroup in one of multiple terminal groups monitors the paging PDCCH Here, it should be noted that each PO corresponds to a terminal group, and all terminal devices in the terminal group correspond to the same PO. The terminal group may be further divided into multiple subgroups in a specific manner, and optionally, division of the subgroups may be made according to UE_ID of the terminal devices.

Furthermore, after the monitoring occasion of the first energy-saving signal is determined through the above solutions, the terminal device monitors the first energy-saving signal at the monitoring occasion of the first energy-saving signal. Here, the monitoring occasion of the first energy-saving signal (that is, a monitoring occasion of the energy-saving signal associated with the target paging unit or a monitoring occasion of the energy-saving signal associated with the target paging unit group) may be referred to as the target monitoring occasion, and the terminal device does not monitor the first energy-saving signal outside the target monitoring occasion, to achieve the power-saving purpose.

It should be noted that in the technical solutions of the embodiments of the disclosure, descriptions about "the time window" may also be replaced by "a set of monitoring occasions". Based on this, the time window where the monitoring occasion of the first energy-saving signal is located may be understood as a set of monitoring occasions of the first energy-saving signal. Here, the set of monitoring occasion includes N monitoring occasions. In some optional implementations, value of N is related to parameters configured by the network, for example, the value of N is related to a number of actually transmitted Synchronization Signal and PBCH Blocks (SSBs) configured by the network. Here, the network may indicate the number of actually transmitted SSBs through indication information (such as ssb-PositionsInBurst) in the system message (such as SIB1).

Furthermore, in some optional implementations, the disclosure further includes the following solutions. It should be noted that the following solutions may be implemented independently, or may be implemented in combination with the above first or second solution.

Third Solution

In the embodiment of the disclosure, the terminal device determines a monitoring occasion of a second energy-saving signal which is an energy-saving signal carrying first indication information, the first indication information is configured to indicate a set of available transmission occasions of a reference signal.

In some optional implementations, the second energy-saving signal is a PEI signal.

In some optional implementations, the reference signal includes at least one of a Tracking Reference Signal (TRS) or a Channel State Information Reference Signal (CSI-RS).

In some optional implementations, the terminal device determines the monitoring occasion of the second energy-saving signal based on first configuration information, the first configuration information is configured to configure a first time period, and the first time period is a valid time period of the monitoring occasion of the second energy-saving signal carrying the first indication information.

Here, after the terminal device determines the valid time period of the monitoring occasion of the second energy-saving signal, the terminal device monitors the second energy-saving signal at the monitoring occasion of the second energy-saving signal within the valid time period.

In some optional implementations, the second energy-saving signal carrying the first indication information is the same as the first energy-saving signal associated with the target paging unit or the target paging unit group. Here, the first energy-saving signal associated with the target paging unit or the target paging unit group may carry the first indication information. In this case, the first energy-saving signal is also the second energy-saving signal.

In some optional implementations, the second energy-saving signal carrying the first indication information is different from the energy-saving signal associated with the target paging unit or the target paging unit group. Here, the first energy-saving signal associated with the target paging unit or the target paging unit group may not carry the first indication information. In this case, the second energy-saving signal and the first energy-saving signal are different signals.

The technical solutions of the embodiments of the disclosure are exemplified below in combination with specific application examples. It should be noted that in the following application examples, a first application example corresponds to the above first solution, a second application example corresponds to the above second solution, and a third application example corresponds to the above third solution. The third application example may be implemented independent of the first application example and the second application example, or may be implemented in combination with the first application example or the second application example. It should be noted that in the following application examples, descriptions are made by an example of taking the paging unit as a PO, and a case where the paging unit is a PF is also applicable to the following application examples.

First Application Example

According to a target PO (that is, a PO corresponding to the terminal device), the terminal device uses a monitoring occasion of PEI corresponding to the target PO as the target monitoring occasion. Here, in order to indicate whether the paging PDCCH is monitored in its associated PO through the PEI, each PO has a monitoring occasion of associated PEI.

Figure 7:
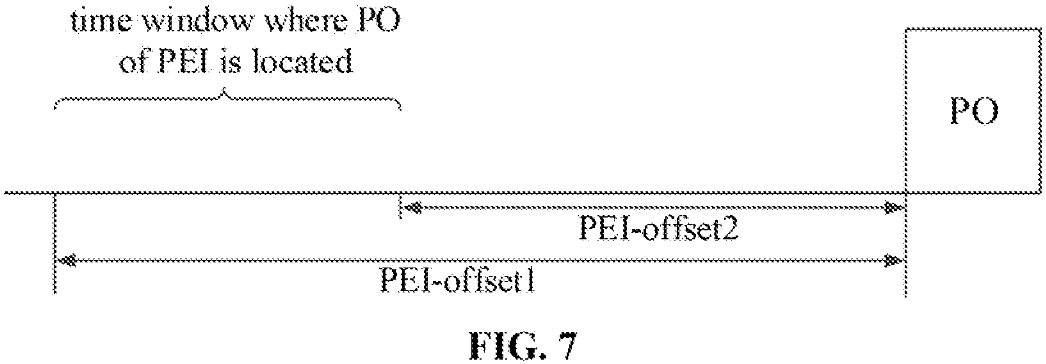
FIG. 7 is a schematic diagram of a time window where a monitoring occasion of Paging Early Indication (PEI) is located, provided in an embodiment of the disclosure.

The network may configure a time window containing the monitoring occasion of PEI. As shown in FIG. 7, the monitoring occasion of PEI in the time window is associated with the target PO, and the terminal device may determine that the PEI needs to be monitored in which time window according to configuration of the network.

In the embodiment, according to the target PO corresponding to the terminal device, the terminal device determines a monitoring occasion of PEI associated with the target PO. Here, manners used by the terminal device to determine PF and PO corresponding thereto may refer to the foregoing relevant solutions, the PF determined by the terminal device may be referred to as a target PF, and the PO determined by the terminal device may be referred to as a target PO. After the terminal device determines the target PO, the terminal device determines a time window where a monitoring occasion of corresponding PEI is located according to a time domain position of the target PO.

Specifically, the terminal device determines the time window where the monitoring occasion of PEI is located according to the time domain position of the target PO and parameters configured by the network. For example, as shown in FIG. 7, the network configures parameters PEI-offset1 and PEI-offset2, the parameter PEI-offset1 is configured to indicate an offset of a start time of the time window relative to a start time of the target PO, and the parameter PEI-offset2 is configured to indicate an offset of an end time of the time window relative to the start time of the target PO.

Figure 8:
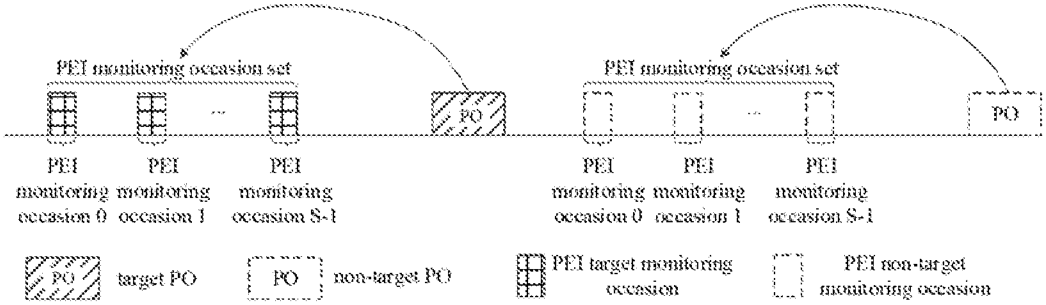
FIG. 8 is a first schematic diagram of a target monitoring occasion of PEI provided in an embodiment of the disclosure.

In the embodiment, the terminal device determines the monitoring occasion of the PEI corresponding to the target PO, according to the target PO and a time relationship between the PEI and the target PO. Specifically, the terminal device needs to monitor the PEI only at the monitoring occasion of the PEI corresponding to the target PO, and does not need to monitor the PEI at a monitoring occasion of PEI corresponding to a non-target PO. Since the network does not send a paging message corresponding to the terminal device on the non-target PO, the terminal device does not need to monitor the PEI at the monitoring occasion of the PEI corresponding to the non-target PO. In this way, power consumption of the terminal device may be reduced. As shown in FIG. 8, the terminal device monitors the PEI only at the monitoring occasion of the PEI corresponding to the target PO.

Second Application Example

According to a target PO group (that is, a PO group to which the PO corresponding to the terminal device belongs), the terminal device uses a monitoring occasion of PEI corresponding to the target PO group as the target monitoring occasion.

Figure 9:
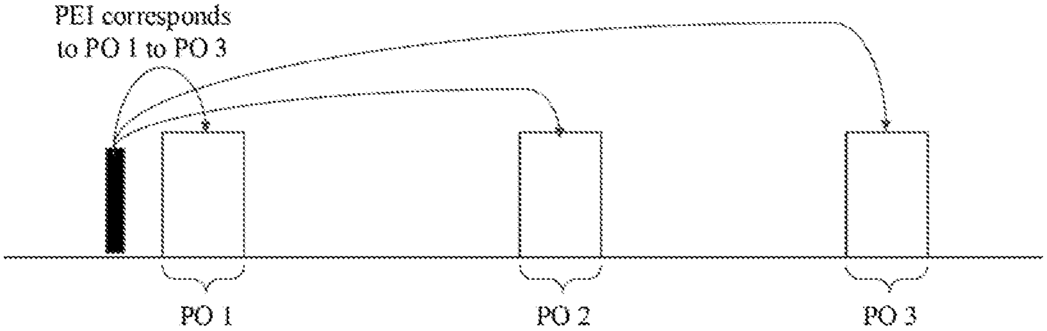
FIG. 9 is a schematic diagram of PEI corresponding to multiple POs, provided in an embodiment of the disclosure.

Here, a PEI may indicate PEI information of multiple POs, such as PEI information of multiple POs which are continuous in time. Multiple POs may form a PO group corresponding to the PEI. As shown in FIG. 9, a PEI corresponds to 3 POs, and the PEI indicates PEI information of the 3 POs, that is, indicates whether each of the 3 POs needs to monitor the paging PDCCH.

Figure 10:
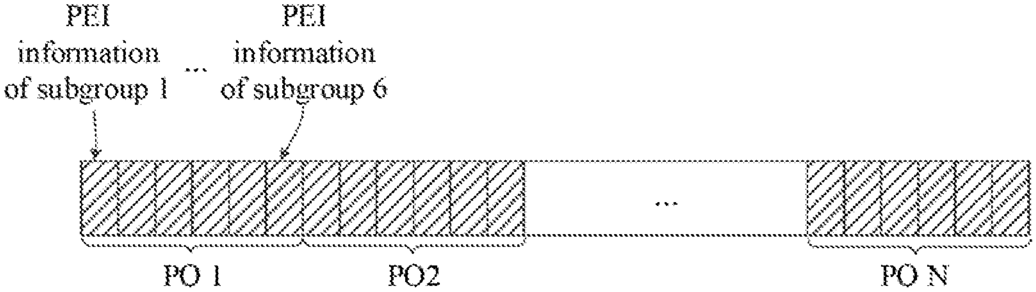
FIG. 10 is a schematic diagram of PEI indicating PEI information of multiple subgroups, provided in an embodiment of the disclosure.

Optionally, a terminal group corresponding to the PO may be divided into multiple subgroups, and PEI information of each subgroup corresponding to one or more POs may be indicated through the PEI. As shown in FIG. 10, a PEI corresponding to N POs is taken as an example, N is a positive integer, each of the N POs corresponds to a terminal group, and the terminal group is divided into multiple subgroups, and a number of subgroups divided from different terminal groups may be the same or different. N POs correspond to N terminal groups. Each terminal group divided into 6 subgroups is taken as an example, the PEI may indicate PEI information of N×6 subgroups in total.

In the embodiment, according to the target PO corresponding to the terminal device, the terminal device determines the monitoring occasion of the PEI associated with the target PO group to which the target PO belongs. Here, manners used by the terminal device to determine PF and PO corresponding thereto may refer to the foregoing relevant solutions, the PF determined by the terminal device may be referred to as a target PF, and the PO determined by the terminal device may be referred to as a target PO; the PO group to which the target PO belongs may be referred to as the target PO group. After the terminal device determines the target PO group, the terminal device determines a time window where a monitoring occasion of corresponding PEI is located according to a time domain position of the target PO group.

Here, the network may configure the PEI to correspond to multiple POs (that is, the PEI corresponds to a PO group). According to configuration information of the PO group configured by the network, the terminal device may determine number and time domain positions of POs included in the PO group. The terminal device determines the PO group to which the target PO belongs according to the time domain position of the target PO and the time domain positions of the POs included in the PO group.

Specifically, the terminal device determines the time window where the monitoring occasion of PEI is located according to the time domain position of the target PO group and parameters configured by the network. For example, similar to FIG. 7, the network configures parameters PEI-offset1 and PEI-offset2, the parameter PEI-offset1 is configured to indicate an offset of a start time of the time window relative to a start time of a first PO in the target PO group, and the parameter PEI-offset2 is configured to indicate an offset of an end time of the time window relative to the start time of the first PO in the target PO group.

Figure 11:
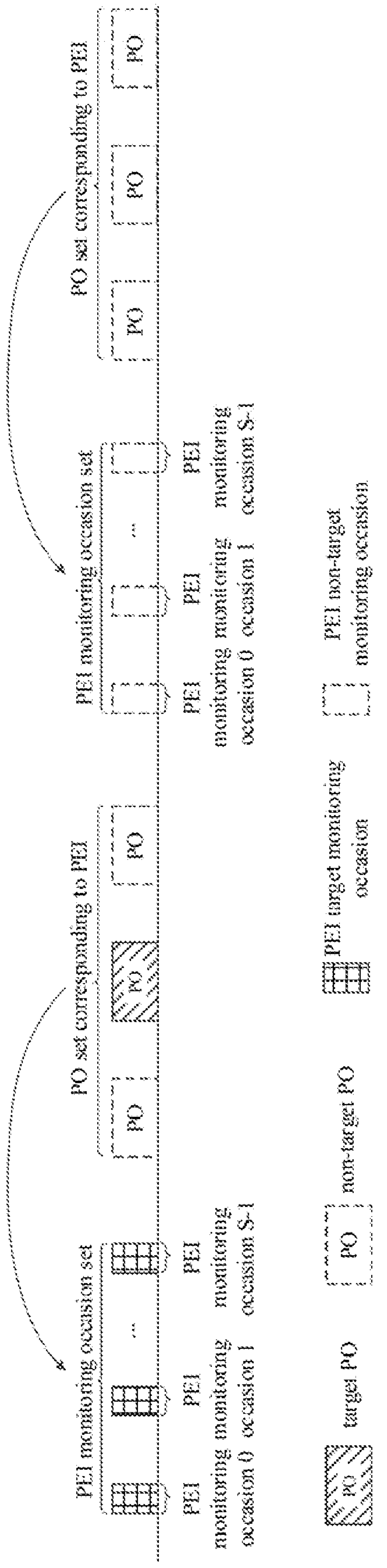
FIG. 11 is a second schematic diagram of a target monitoring occasion of PEI provided in an embodiment of the disclosure.

In the embodiment, the terminal device needs to monitor the PEI only at the monitoring occasion of the PEI corresponding to the PO group to which the target PO belongs. When a PO group does not include the target PO, the terminal device does not need to monitor the PEI at a monitoring occasion of PEI corresponding to the PO group. As shown in FIG. 11, when the target PO group includes the target PO, the terminal device monitors the PEI at a set of monitoring occasions of the PEI corresponding to the target PO group. When the target PO group does not include the target PO, the terminal device does not monitor the PEI at the set of monitoring occasions of the PEI corresponding to the target PO group.

Third Application Example

The terminal device uses a monitoring occasion of PEI carrying indication information of a set of available TRS/CSI-RS transmission occasions as the target monitoring occasion.

In case of the terminal device in the RRC idle state or inactive state, the terminal device needs to perform time-frequency tracking and Automatic Gain Control (AGC) before PO corresponding thereto detects paging. Since the terminal device in the RRC idle state is not configured with reference signals such as TRS/CSI-RS or the like, time-frequency synchronization may be performed only by using a periodically transmitted SS/PBCH block (hereinafter, referred to as SSB for abbreviation). In order to reduce further power consumption of receiving paging, configuring TRS/CSI-RS for the terminal device in the RRC idle state is introduced, which is used for the terminal device in the RRC idle state to perform time-frequency tracking.

In case of the terminal device in the RRC idle state or inactive state, configuration of TRS/CSI-RS may be configured through a public message such as a system message. Resources of TRS/CSI-RS have a certain periodicity, that is, transmission occasions of TRS/CSI-RS appear periodically. However, the terminal device in the RRC idle state or inactive state does not need to receive TRS/CSI-RS at all transmission occasions, to achieve power saving. Main usage of TRS/CSI-RS lies in that the terminal device performs time-frequency tracking and AGC through TRS/CSI-RS before arrival of the PO, etc. When the terminal device does not need to receive paging on the PO, the terminal device does not need to detect TRS/CSI-RS, to achieve a power-saving effect.

The terminal device needs to determine a position of the set of available TRS/CSI-RS transmission occasions, and to this end, the set of available TRS/CSI-RS transmission occasions may be indicated in the PEI. The terminal device needs to receive the PEI to obtain information of the set of available TRS/CSI-RS transmission occasions. To this end, when the terminal device needs to obtain indication information of the set of available TRS/CSI-RS transmission occasions through the PEI, the terminal device also needs to determine the monitoring occasion of the PEI.

In the embodiment, the terminal device determines the monitoring occasion of the target PEI according to the monitoring occasion of the PEI carrying the indication information of the set of available TRS/CSI-RS transmission occasions. Specifically, not all PEI need to carry the indication information of the set of available TRS/CSI-RS transmission occasions. The network may configure the PEI carrying the indication information of the set of available TRS/CSI-RS transmission occasions to be transmitted at monitoring occasions of which PEIs. The indication information of the set of available TRS/CSI-RS transmission occasions indicates a valid time period of the set of available TRS/CSI-RS transmission occasions. The network may send the indication information periodically through the PEI. Since the network may update the indication information, or in order for terminal devices starting to receive PEI information at different times to obtain the indication information, a set of monitoring occasions of the PEI carrying the indication information is decoupled from a set of monitoring occasions of PEI determined according to the target PO corresponding to the terminal device, that is, they may be different.

In order for the terminal device to obtain the indication information of the set of available TRS/CSI-RS transmission occasions through the PEI, the following first and second methods may be used.

In the first method, the network may carry the indication information of the set of available TRS/CSI-RS transmission occasions, at PEI sent at the monitoring occasions of PEI corresponding to all POs or PO groups.

In the second method, the network configures a set of monitoring occasions of PEI carrying the indication information of the set of available TRS/CSI-RS transmission occasions, and the terminal device needs to monitor monitoring occasions of these PEI to obtain the indication information of the set of available TRS/CSI-RS transmission occasions.

According to the above technical solutions of the embodiments of the disclosure, the terminal device may specify the monitoring occasion of the PEI, thereby reducing unnecessary monitoring of the PEI, and achieving the power-saving purpose of the terminal device.

The preferred embodiments of the disclosure have been described in detail as above with reference to the drawings. However, the disclosure is not limited to specific details of the above embodiments. Various simple variations may be made to the technical solutions of the disclosure within the scope of the technical concept of the disclosure, and all these simple variations fall within the scope of protection of the disclosure. For example, each specific technical feature described in the above specific embodiments may be combined in any suitable way without conflict, and various possible combinations will not be described in the disclosure to avoid unnecessary repetition. For another example, various different embodiments of the disclosure may also be arbitrarily combined there-between, as long as such combination does not violate the idea of the disclosure, and they should also be considered as contents disclosed in the disclosure. For another example, each embodiment described in the disclosure and/or technical features in each embodiment may be arbitrarily combined with the related art without conflict, and technical solutions obtained after such combination should also fall within the scope of protection of the disclosure.

It should also be understood that in various method embodiments of the disclosure, sizes of serial numbers of the above processes do not mean an execution sequence of the processes. The execution sequence of each process should be determined by its functions and internal logic, and should not constitute any limitation on implementation of the embodiments of the disclosure. Furthermore, in the embodiments of the disclosure, terms "downlink", "uplink" and "sidelink" are intended to indicate transmission directions of signals or data, "downlink" is intended to indicate that a transmission direction of signals or data is a first direction of sending signals or data from a station to UE of a cell, "uplink" is intended to indicate that a transmission direction of signals or data is a second direction of sending signals or data from UE of a cell to a station, and "sidelink" is intended to indicate that a transmission direction of signals or data is a third direction of sending signals or data from UE1 to UE2. For example, "downlink signal" indicates that a transmission direction of the signal is the first direction. Furthermore, in the embodiments of the disclosure, term "and/or" is only an association relationship describing associated objects, and indicate that there may be three relationships. Specifically, A and/or B may indicate three situations, that is, A exists alone, A and B exist simultaneously, and B exists alone. Furthermore, a character "/" here usually indicates that anterior and posterior associated objects are in a "or" relationship.

Figure 12:
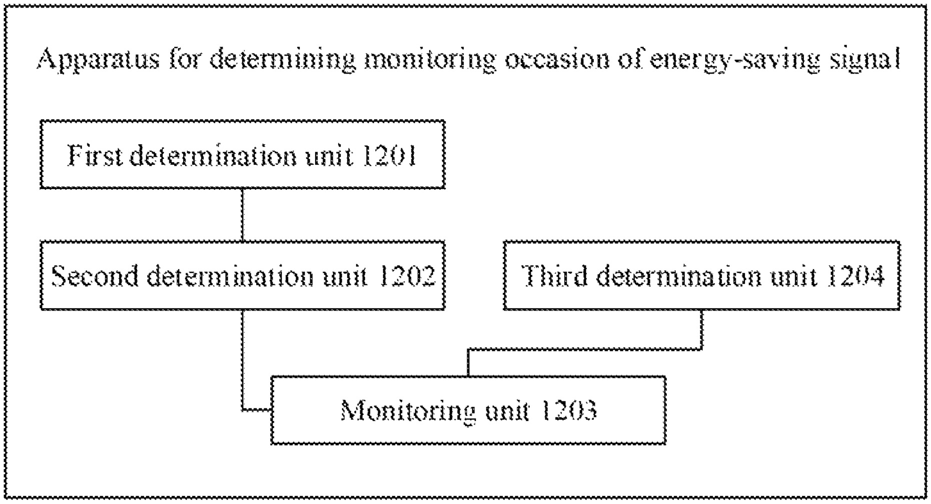
FIG. 12 is a schematic diagram of structure and composition of an apparatus for determining a monitoring occasion of an energy-saving signal provided in an embodiment of the disclosure.

FIG. 12 is a schematic diagram of structure and composition of an apparatus for determining a monitoring occasion of an energy-saving signal provided in an embodiment of the disclosure, the apparatus is applied to a terminal device. As shown in FIG. 12, the apparatus for determining a monitoring occasion of an energy-saving signal includes a first determination unit 1201 and a second determination unit 1202.

The first determination unit 1201 is configured to determine a target paging unit which is a PO or PF corresponding to the terminal device.

The second determination unit 1202 is configured to determine a monitoring occasion of a first energy-saving signal based on the target paging unit, here, the first energy-saving signal is an energy-saving signal associated with the target paging unit or an energy-saving signal associated with a target paging unit group, and the target paging unit belongs to the target paging unit group.

In some optional implementations, in a case that the first energy-saving signal is the energy-saving signal associated with the target paging unit, the second determination unit 1202 is configured to determine a time window where the monitoring occasion of the first energy-saving signal is located, based on a time domain position of the target paging unit, one or more monitoring occasions of the first energy-saving signal are included in the time window.

In some optional implementations, the second determination unit 1202 is configured to determine the time window where the monitoring occasion of the first energy-saving signal is located, based on the time domain position of the target paging unit and a first configuration parameter.

In some optional implementations, the first configuration parameter includes at least one of:

a first parameter, configured to indicate an offset of a start time of the time window relative to a start time or end time of the target paging unit;

a second parameter, configured to indicate an offset of an end time of the time window relative to the start time or end time of the target paging unit; or a third parameter, configured to indicate a time length of the time window.

In some optional implementations, the first energy-saving signal is configured to indicate energy-saving information corresponding to a paging unit, and the paging unit is the target paging unit.

In some optional implementations, the first energy-saving signal is configured to indicate energy-saving information corresponding to a PO, and the PO corresponds to a terminal group.

The first energy-saving signal includes a piece of energy-saving information, and the piece of energy-saving information is configured to indicate whether the terminal group monitors a paging PDCCH.

Alternatively, the first energy-saving signal includes multiple energy-saving information, and each of multiple energy-saving information is configured to indicate whether a subgroup in the terminal group monitors the paging PDCCH.

In some optional implementations, in a case that the first energy-saving signal is the energy-saving signal associated with the target paging unit group, the second determination unit 1202 is configured to determine the target paging unit group to which the target paging unit belongs, based on the target paging unit; and determine a time window where the monitoring occasion of the first energy-saving signal is located, based on a time domain position of the target paging unit group, one or more monitoring occasions of the first energy-saving signal are included in the time window.

In some optional implementations, the second determination unit 1202 is configured to determine the target paging unit group to which the target paging unit belongs, based on a time domain position of the target paging unit and configuration information of a paging unit group, the configuration information of the paging unit group is configured to determine time domain positions of multiple paging units.

In some optional implementations, the second determination unit 1202 is configured to determine the time window where the monitoring occasion of the first energy-saving signal is located, based on the time domain position of the target paging unit group and a second configuration parameter.

In some optional implementations, the second configuration parameter includes at least one of:

a fourth parameter, configured to indicate an offset of a start time of the time window relative to a start time of a first paging unit in the target paging unit group or an end time of a last paging unit in the target paging unit group;

a fifth parameter, configured to indicate an offset of an end time of the time window relative to the start time of the first paging unit in the target paging unit group or the end time of the last paging unit in the target paging unit group; or a sixth parameter, configured to indicate a time length of the time window.

In some optional implementations, the first energy-saving signal is configured to indicate energy-saving information corresponding to a paging unit group, and the paging unit group includes multiple paging units which include the target paging unit.

In some optional implementations, the first energy-saving signal is configured to indicate energy-saving information corresponding to a PO group, each PO in the PO group corresponds to a terminal group, and the PO group corresponds to multiple terminal groups.

The first energy-saving signal includes a piece of energy-saving information, and the piece of energy-saving information is configured to indicate whether multiple terminal groups monitor a paging PDCCH.

Or, the first energy-saving signal includes multiple energy-saving information, and each of multiple energy-saving information is configured to indicate whether one of multiple terminal groups monitors the paging PDCCH.

Or, the first energy-saving signal includes multiple energy-saving information, and each of multiple energy-saving information is configured to indicate whether a subgroup in one of multiple terminal groups monitors the paging PDCCH.

In some optional implementations, the apparatus further includes a monitoring unit 1203.

The monitoring unit 1203 is configured to monitor the first energy-saving signal at the monitoring occasion of the first energy-saving signal.

In some optional implementations, the apparatus further includes a third determination unit 1204.

The third determination unit 1204 is configured to determine a monitoring occasion of a second energy-saving signal which is an energy-saving signal carrying first indication information, the first indication information is configured to indicate a set of available transmission occasions of a reference signal.

In some optional implementations, the third determination unit 1204 is configured to determine the monitoring occasion of the second energy-saving signal based on first configuration information, the first configuration information is configured to configure a first time period, and the first time period is a valid time period of the monitoring occasion of the second energy-saving signal carrying the first indication information.

In some optional implementations, the apparatus further includes a monitoring unit 1203.

The monitoring unit 1203 is configured to monitor the second energy-saving signal at the monitoring occasion of the second energy-saving signal.

In some optional implementations, the second energy-saving signal carrying the first indication information is the same as the first energy-saving signal associated with the target paging unit or the target paging unit group; or, the second energy-saving signal carrying the first indication information is different from the energy-saving signal associated with the target paging unit or the target paging unit group.

In some optional implementations, the reference signal includes at least one of TRS or CSI-RS.

In some optional implementations, the second energy-saving signal is a PEI signal.

In some optional implementations, the first energy-saving signal is a PEI signal.

It should be understood by those skilled in the art that relevant descriptions of the above apparatus for determining a monitoring occasion of an energy-saving signal according to the embodiments of the disclosure may be understood with reference to relevant descriptions of the method for determining a monitoring occasion of an energy-saving signal according to the embodiments of the disclosure.

Figure 13:
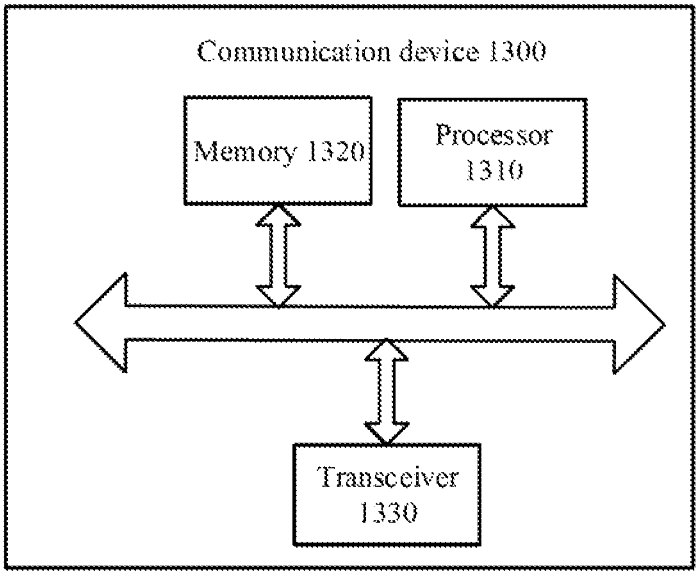
FIG. 13 is a schematic structural diagram of a communication device provided in an embodiment of the disclosure.

FIG. 13 is a schematic structural diagram of a communication device 1300 provided in an embodiment of the disclosure. The communication device may be a terminal device. The communication device 1300 shown in FIG. 13 includes a processor 1310. The processor 1310 may call and run a computer program from a memory to implement the methods in the embodiments of the disclosure.

Optionally, as shown in FIG. 13, the communication device 1300 may further include a memory 1320. The processor 1310 may call and run the computer program from the memory 1320 to implement the methods in the embodiments of the disclosure.

The memory 1320 may be a separate device independent of the processor 1310, or may be integrated into the processor 1310.

Optionally, as shown in FIG. 13, the communication device 1300 may further include a transceiver 1330. The processor 1310 may control the transceiver 1330 to communicate with other devices. Specifically, the processor 1310 may control the transceiver 1330 to send information or data to other devices, or receive information or data sent by other devices.

The transceiver 1330 may include a transmitter and a receiver. The transceiver 1330 may further include an antenna, and there may be one or more antennas in number.

Optionally, the communication device 1300 may be specifically the network device according to the embodiments of the disclosure, and the communication device 1300 may implement corresponding processes in each method according to the embodiments of the disclosure implemented by the network device, which are not elaborated here, for the sake of brevity.

Optionally, the communication device 1300 may be specifically the mobile terminal/terminal device according to the embodiments of the disclosure, and the communication device 1300 may implement corresponding processes in each method according to the embodiments of the disclosure implemented by the mobile terminal/terminal device, which are not elaborated here, for the sake of brevity.

Figure 14:
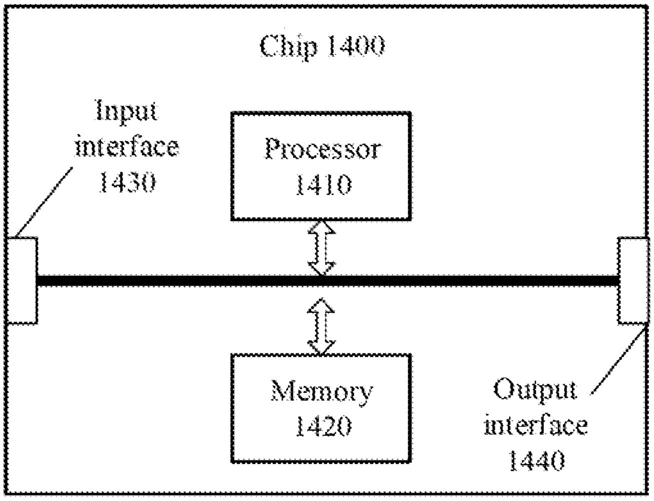
FIG. 14 is a schematic structural diagram of a chip according to an embodiment of the disclosure.

FIG. 14 is a schematic structural diagram of a chip according to an embodiment of the disclosure. The chip 1400 shown in FIG. 14 includes a processor 1410. The processor 1410 may call and run a computer program from a memory to implement the methods in the embodiments of the disclosure.

Optionally, as shown in FIG. 14, the chip 1400 may further include a memory 1420. The processor 1410 may call and run the computer program from the memory 1420 to implement the methods in the embodiments of the disclosure.

The memory 1420 may be a separate device independent of the processor 1410, or may be integrated into the processor 1410.

Optionally, the chip 1400 may further include an input interface 1430. The processor 1410 may control the input interface 1430 to communicate with other devices or chips. Specifically, the processor 1410 may control the input interface 1430 to obtain information or data sent by other devices or chips.

Optionally, the chip 1400 may further include an output interface 1440. The processor 1410 may control the output interface 1440 to communicate with other devices or chips. Specifically, the processor 1410 may control the output interface 1440 to output information or data to other devices or chips.

Optionally, the chip may be applied to the network device according to the embodiments of the disclosure, and the chip may implement corresponding processes in each method according to the embodiments of the disclosure implemented by the network device, which are not elaborated here, for the sake of brevity.

Optionally, the chip may be applied to the mobile terminal/terminal device according to the embodiments of the disclosure, and the chip may implement corresponding processes in each method according to the embodiments of the disclosure implemented by the mobile terminal/terminal device, which are not elaborated here, for the sake of brevity.

It should be understood that the chip mentioned in the embodiments of the disclosure may also be referred to as a system-level chip, a system chip, a chip system, or a system-on-chip chip, etc.

Figure 15:
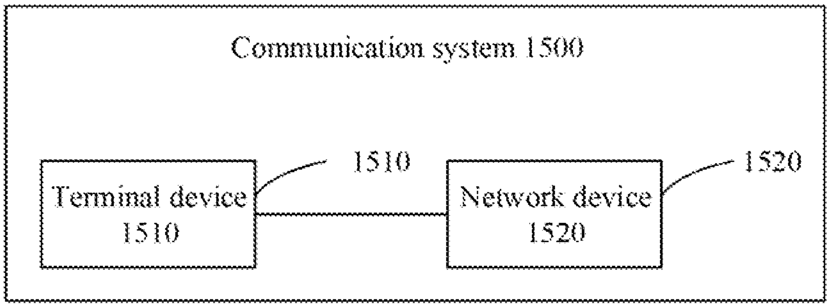
FIG. 15 is a schematic block diagram of a communication system provided in an embodiment of the disclosure.

FIG. 15 is a schematic block diagram of a communication system 1500 provided in an embodiment of the disclosure. As shown in FIG. 15, the communication system 1500 includes a terminal device 1510 and a network device 1520.

The terminal device 1510 may be configured to implement corresponding functions in the above methods implemented by the terminal device, and the network device 1520 may be configured to implement corresponding functions in the above methods implemented by the network device, which are not elaborated here, for the sake of brevity.

It should be understood that the processor in the embodiments of the disclosure may be an integrated circuit chip with signal processing capability. During implementation, each operation of the above method embodiments may be completed by an integrated logic circuit in form of hardware in the processor or instructions in form of software. The above processor may be a general-purpose processor, a Digital Signal Processor (DSP), an Application Specific Integrated Circuit (ASIC), a Field Programmable Gate Array (FPGA) or other programmable logic devices, a discrete gate or a transistor logic device, a discrete hardware component, so that each method, operation and logical block diagram disclosed in the embodiments of the disclosure may be implemented or performed. The general-purpose processor may be a microprocessor, or any conventional processor, etc. Operations of the methods disclosed in combination with the embodiments of the disclosure may be directly embodied as being performed and completed by a hardware decoding processor, or performed and completed by a combination of hardware in the decoding processor and a software module. The software module may be located in a mature storage medium in the field such as a random memory, a flash memory, a Read-Only Memory (ROM), a Programmable ROM (PROM) or an electrically erasable programmable memory, a register, etc. The storage medium is located in a memory, and the processor reads information in the memory and completes operations of the above methods in combination with hardware thereof.

It may be understood that the memory in the embodiments of the disclosure may be a volatile memory or a non-volatile memory, or may include both volatile and non-volatile memories. The non-volatile memory may be a ROM, a PROM, an Erasable PROM (EPROM), an Electrically EPROM (EEPROM), or a flash memory. The volatile memory may be a Random Access Memory (RAM) used as an external cache. By way of exemplary descriptions rather than restrictive descriptions, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a SynchLink DRAM (SLDRAM), a Direct Rambus RAM (DR RAM). It should be noted that memories of the systems and methods described here are intended to include, but are not limited to memories of these and any other suitable types.

It should be understood that the above memories are exemplary descriptions rather than restrictive descriptions. For example, memories in the embodiments of the disclosure may also be a static RAM (SRAM), a DRAM, a SDRAM, a DDR SDRAM, an ESDRAM, a SLDRAM, a DR RAM, etc. That is, memories in the embodiments of the disclosure are intended to include, but are not limited to memories of these and any other suitable types.

An embodiment of the disclosure further provides a computer-readable storage medium, the computer-readable storage medium is configured to store a computer program.

Optionally, the computer-readable storage medium may be applied to the network device in the embodiments of the disclosure, and the computer program allows a computer to execute corresponding processes in each method according to the embodiments of the disclosure implemented by the network device, which are not elaborated here, for the sake of brevity.

Optionally, the computer-readable storage medium may be applied to the mobile terminal/terminal device in the embodiments of the disclosure, and the computer program allows a computer to execute corresponding processes in each method according to the embodiments of the disclosure implemented by the mobile terminal/terminal device, which are not elaborated here, for the sake of brevity.

An embodiment of the disclosure further provides a computer program product, the computer program product includes computer program instructions.

Optionally, the computer program product may be applied to the network device in the embodiments of the disclosure, and the computer program instructions allow a computer to execute corresponding processes in each method according to the embodiments of the disclosure implemented by the network device, which are not elaborated here, for the sake of brevity.

Optionally, the computer program product may be applied to the mobile terminal/terminal device in the embodiments of the disclosure, and the computer program instructions allow a computer to execute corresponding processes in each method according to the embodiments of the disclosure implemented by the mobile terminal/terminal device, which are not elaborated here, for the sake of brevity.

An embodiment of the disclosure further provides a computer program.

Optionally, the computer program may be applied to the network device in the embodiments of the disclosure, and when the computer program is run on a computer, the computer program allows the computer to execute corresponding processes in each method according to the embodiments of the disclosure implemented by the network device, which are not elaborated here, for the sake of brevity.

Optionally, the computer program may be applied to the mobile terminal/terminal device in the embodiments of the disclosure, and when the computer program is run on a computer, the computer program allows the computer to execute corresponding processes in each method according to the embodiments of the disclosure implemented by the mobile terminal/terminal device, which are not elaborated here for the sake of brevity.

It may be appreciated by those of ordinary skill in the art that units and algorithm steps of each example described in combination with the embodiments disclosed here may be implemented by electronic hardware, or a combination of computer software and electronic hardware. Whether these functions are performed in hardware or software, depends on specific applications and design constraints of the technical solutions. Professional technicians may use different methods in each specific application to implement the described functions, however, such implementation should not be considered as going beyond the scope of the disclosure.

It may be clearly understood by those skilled in the art that for the sake of convenience and brevity of descriptions, specific operation processes of the above systems, apparatuses and units may refer to corresponding processes in the foregoing method embodiments, which are not elaborated here.

In several embodiments provided in the disclosure, it should be understood that the disclosed systems, apparatuses and methods may be implemented in other ways. For example, the above apparatus embodiments are only illustrative. For example, division of the units is only a logical function division. In an actual implementation, there may be other division manners. For example, multiple units or components may be combined or may be integrated into another system, or some features may be ignored or may not be performed. In another point, mutual coupling or direct coupling or communication connection as shown or discussed may be indirect coupling or communication connection through some interfaces, devices or units, and may be in electrical, mechanical or other forms.

The units described as separate components may be or may not be physically separated, and the components displayed as units may be or may not be physical units, that is, they may be located in one place, or may be distributed on multiple network units. Part or all of the units may be selected according to actual requirements, to achieve the purpose of the solutions of the embodiments.

Furthermore, each functional unit in each embodiment of the disclosure may be integrated into one processing unit, or each unit may separately exist physically, or two or more units may be integrated into one unit.

When the functions are implemented in form of a software function unit and sold or used as an independent product, the functions may be stored in a computer-readable storage medium. Based on such understanding, the technical solutions of the disclosure substantially or parts making contributions to the related art or part of the technical solutions may be embodied in form of a software product, and the computer software product is stored in a storage medium, includes several instructions to enable a computer device (which may be a personal computer, a server, or a network device, etc.) to execute all or part of operations of the method described in each embodiment of the disclosure. The foregoing storage medium includes various media capable of storing program codes, such as a U disk, a mobile hard disk, a ROM, a RAM, a magnetic disk or an optical disk, etc.

The above descriptions are only specific implementations of the disclosure, however, the scope of protection of the disclosure is not limited thereto. Variations or replacements easily conceived by any technician familiar with this technical field within the technical scope disclosed in the disclosure, should fall within the scope of protection of the disclosure. Therefore, the scope of protection of the disclosure shall be subjected to the scope of protection of the claims.

The invention claimed is:

1. A method for determining a monitoring occasion of an energy-saving signal, comprising:

determining, by a terminal device, a target paging unit which is a Paging Occasion (PO) or Paging Frame (PF) corresponding to the terminal device; and determining, by the terminal device, a monitoring occasion of a first energy-saving signal based on the target paging unit, wherein the first energy-saving signal is an energy-saving signal associated with the target paging unit or an energy-saving signal associated with a target paging unit group, and the target paging unit belongs to the target paging unit group.

2. The method of claim 1, wherein in a case that the first energy-saving signal is the energy-saving signal associated with the target paging unit, determining, by the terminal device, the monitoring occasion of the first energy-saving signal based on the target paging unit comprises:

determining, by the terminal device, a time window where the monitoring occasion of the first energy-saving signal is located, based on a time domain position of the target paging unit, wherein one or more monitoring occasions of the first energy-saving signal are comprised in the time window.

3. The method of claim 2, wherein determining, by the terminal device, the time window where the monitoring occasion of the first energy-saving signal is located, based on the time domain position of the target paging unit comprises:

determining, by the terminal device, the time window where the monitoring occasion of the first energy-saving signal is located, based on the time domain position of the target paging unit and a first configuration parameter.

4. The method of claim 3, wherein the first configuration parameter comprises at least one of:

a first parameter, configured to indicate an offset of a start time of the time window relative to a start time or end time of the target paging unit;

a second parameter, configured to indicate an offset of an end time of the time window relative to the start time or end time of the target paging unit; or a third parameter, configured to indicate a time length of the time window.

5. The method of claim 1, wherein the first energy-saving signal is configured to indicate energy-saving information corresponding to a paging unit, and the paging unit is the target paging unit.

6. The method of claim 5, wherein the first energy-saving signal is configured to indicate energy-saving information corresponding to a PO, and the PO corresponds to a terminal group, the first energy-saving signal comprises a piece of energy-saving information, and the piece of energy-saving information is configured to indicate whether the terminal group monitors a paging Physical Downlink Control Channel (PDCCH); or the first energy-saving signal comprises a plurality of pieces of energy-saving information, and each of the plurality of pieces of energy-saving information is configured to indicate whether a subgroup in the terminal group monitors the paging PDCCH.

7. The method of claim 1, wherein in a case that the first energy-saving signal is the energy-saving signal associated with the target paging unit group, determining, by the terminal device, the monitoring occasion of the first energy-saving signal based on the target paging unit comprises:

determining, by the terminal device, the target paging unit group to which the target paging unit belongs, based on the target paging unit; and determining, by the terminal device, a time window where the monitoring occasion of the first energy-saving signal is located, based on a time domain position of the target paging unit group, wherein one or more monitoring occasions of the first energy-saving signal are comprised in the time window.

8. The method of claim 7, wherein determining, by the terminal device, the target paging unit group to which the target paging unit belongs, based on the target paging unit comprises:

determining, by the terminal device, the target paging unit group to which the target paging unit belongs, based on a time domain position of the target paging unit and configuration information of a paging unit group, wherein the configuration information of the paging unit group is configured to determine time domain positions of a plurality of paging units, wherein determining, by the terminal device, the time window where the monitoring occasion of the first energy-saving signal is located, based on the time domain position of the target paging unit group comprises:

determining, by the terminal device, the time window where the monitoring occasion of the first energy-saving signal is located, based on the time domain position of the target paging unit group and a second configuration parameter.

9. The method of claim 1, wherein the first energy-saving signal is configured to indicate energy-saving information corresponding to a paging unit group, and the paging unit group comprises a plurality of paging units that comprise the target paging unit, wherein the first energy-saving signal is configured to indicate energy-saving information corresponding to a PO group, each PO in the PO group corresponds to a terminal group, and the PO group corresponds to a plurality of terminal groups, the first energy-saving signal comprises a piece of energy-saving information, and the piece of energy-saving information is configured to indicate whether the plurality of terminal groups monitor a paging Physical Downlink Control Channel (PDCCH); or the first energy-saving signal comprises a plurality of pieces of energy-saving information, and each of the plurality of pieces of energy-saving information is configured to indicate whether one terminal group of the plurality of terminal groups monitors the paging PDCCH; or the first energy-saving signal comprises a plurality of pieces of energy-saving information, and each of the plurality of pieces of energy-saving information is configured to indicate whether a subgroup in one terminal group of the plurality of terminal groups monitors the paging PDCCH.

10. A terminal device, comprising:

a memory, configured to store a computer program; and a processor, configured to execute the computer program to:

determine a target paging unit which is a Paging Occasion (PO) or Paging Frame (PF) corresponding to the terminal device; and determine a monitoring occasion of a first energy-saving signal based on the target paging unit, wherein the first energy-saving signal is an energy-saving signal associated with the target paging unit or an energy-saving signal associated with a target paging unit group, and the target paging unit belongs to the target paging unit group.

11. The apparatus of claim 10, wherein the processor is further configured to execute the program to:

in a case that the first energy-saving signal is the energy-saving signal associated with the target paging unit, determine a time window where the monitoring occasion of the first energy-saving signal is located, based on a time domain position of the target paging unit, wherein one or more monitoring occasions of the first energy-saving signal are comprised in the time window.

12. The apparatus of claim 11, wherein the processor is further configured to execute the program to determine the time window where the monitoring occasion of the first energy-saving signal is located, based on the time domain position of the target paging unit and a first configuration parameter.

13. The apparatus of claim 12, wherein the first configuration parameter comprises at least one of:

a first parameter, configured to indicate an offset of a start time of the time window relative to a start time or end time of the target paging unit;

a second parameter, configured to indicate an offset of an end time of the time window relative to the start time or end time of the target paging unit; or a third parameter, configured to indicate a time length of the time window.

14. The apparatus of claim 10, wherein the first energy-saving signal is configured to indicate energy-saving information corresponding to a paging unit, and the paging unit is the target paging unit.

15. The apparatus of claim 14, wherein the first energy-saving signal is configured to indicate energy-saving information corresponding to a PO, and the PO corresponds to a terminal group, the first energy-saving signal comprises a piece of energy-saving information, and the piece of energy-saving information is configured to indicate whether the terminal group monitors a paging Physical Downlink Control Channel (PDCCH); or the first energy-saving signal comprises a plurality of pieces of energy-saving information, and each of the plurality of pieces of energy-saving information is configured to indicate whether a subgroup in the terminal group monitors the paging PDCCH.

16. The apparatus of claim 10, wherein the processor is further configured to execute the program to:

in a case that the first energy-saving signal is the energy-saving signal associated with the target paging unit group, determine the target paging unit group to which the target paging unit belongs, based on the target paging unit; and determine a time window where the monitoring occasion of the first energy-saving signal is located, based on a time domain position of the target paging unit group, wherein one or more monitoring occasions of the first energy-saving signal are comprised in the time window.

17. The apparatus of claim 16, wherein the processor is further configured to execute the program to determine the target paging unit group to which the target paging unit belongs, based on a time domain position of the target paging unit and configuration information of a paging unit group, wherein the configuration information of the paging unit group is configured to determine time domain positions of a plurality of paging units.

18. The apparatus of claim 16, wherein the processor is further configured to execute the program to determine the time window where the monitoring occasion of the first energy-saving signal is located, based on the time domain position of the target paging unit group and a second configuration parameter.

19. The apparatus of claim 10, wherein the first energy-saving signal is configured to indicate energy-saving information corresponding to a paging unit group, and the paging unit group comprises a plurality of paging units that comprise the target paging unit, wherein the first energy-saving signal is configured to indicate energy-saving information corresponding to a PO group, each PO in the PO group corresponds to a terminal group, and the PO group corresponds to a plurality of terminal groups, the first energy-saving signal comprises a piece of energy-saving information, and the piece of energy-saving information is configured to indicate whether the plurality of terminal groups monitor a paging Physical Downlink Control Channel (PDCCH); or the first energy-saving signal comprises a plurality of pieces of energy-saving information, and each of the plurality of pieces of energy-saving information is configured to indicate whether one terminal group of the plurality of terminal groups monitors the paging PDCCH; or the first energy-saving signal comprises a plurality of pieces of energy-saving information, and each of the plurality of pieces of energy-saving information is configured to indicate whether a subgroup in one terminal group of the plurality of terminal groups monitors the paging PDCCH.

20. A chip, comprising:

a processor, configured to call and run a computer program from a memory, so that a device on which the chip is installed executes a method for determining a monitoring occasion of an energy-saving signal, the method comprising:

determining, by a terminal device, a target paging unit which is a Paging Occasion (PO) or Paging Frame (PF) corresponding to the terminal device; and determining, by the terminal device, a monitoring occasion of a first energy-saving signal based on the target paging unit, wherein the first energy-saving signal is an energy-saving signal associated with the target paging unit or an energy-saving signal associated with a target paging unit group, and the target paging unit belongs to the target paging unit group.

* * * * *